March 1, 1966    L. I. JAYNE    3,237,735
IRREVERSIBLE DRIVE
Filed June 24, 1964    2 Sheets-Sheet 1
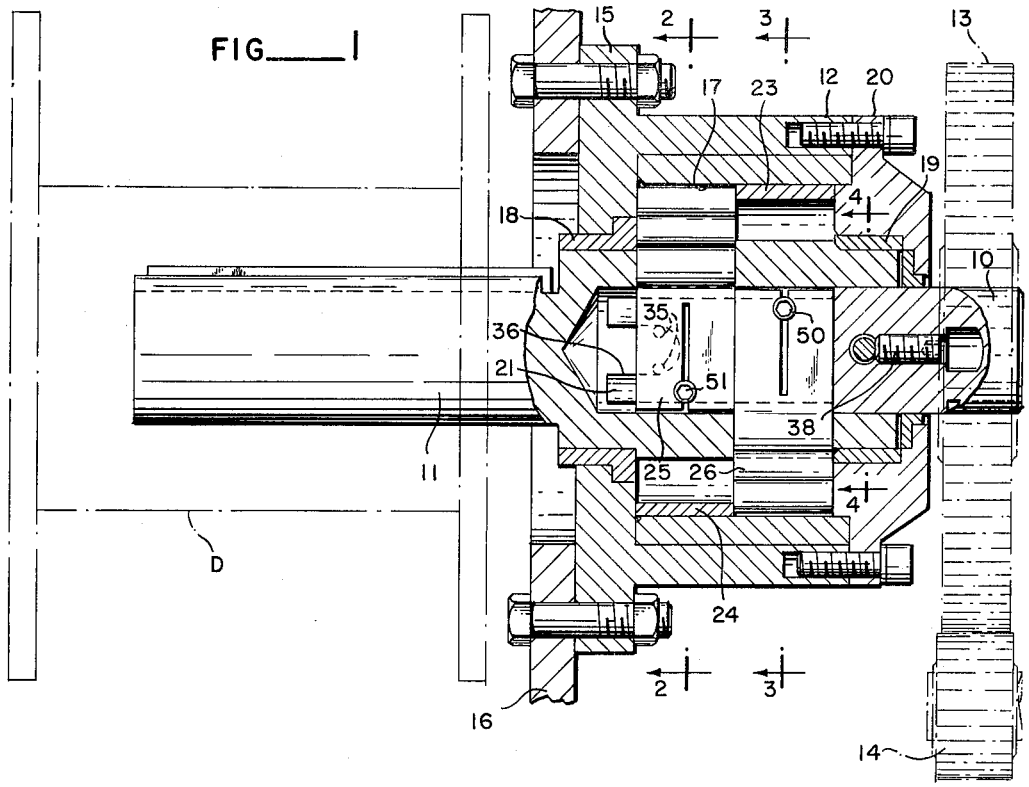
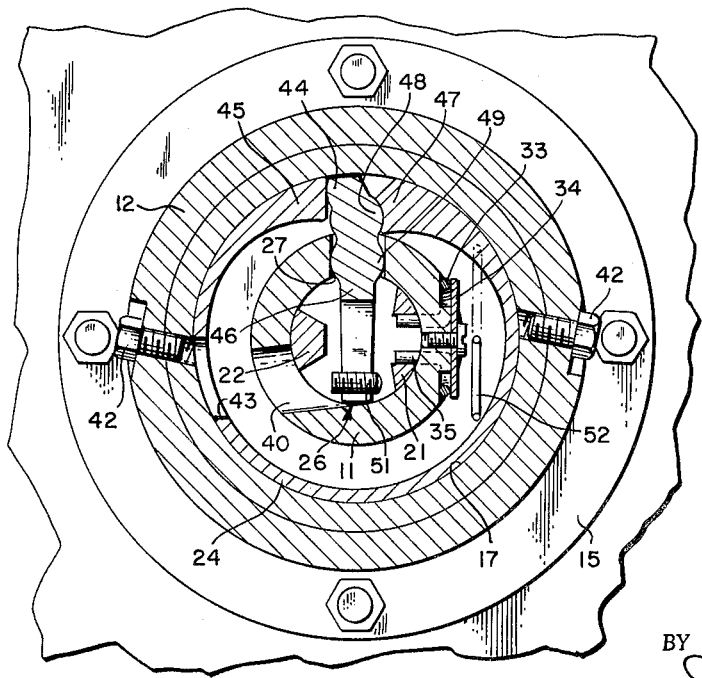
LAURENCE I. JAYNE
*INVENTOR.*
BY *Seed & Berry*
*ATTORNEYS*

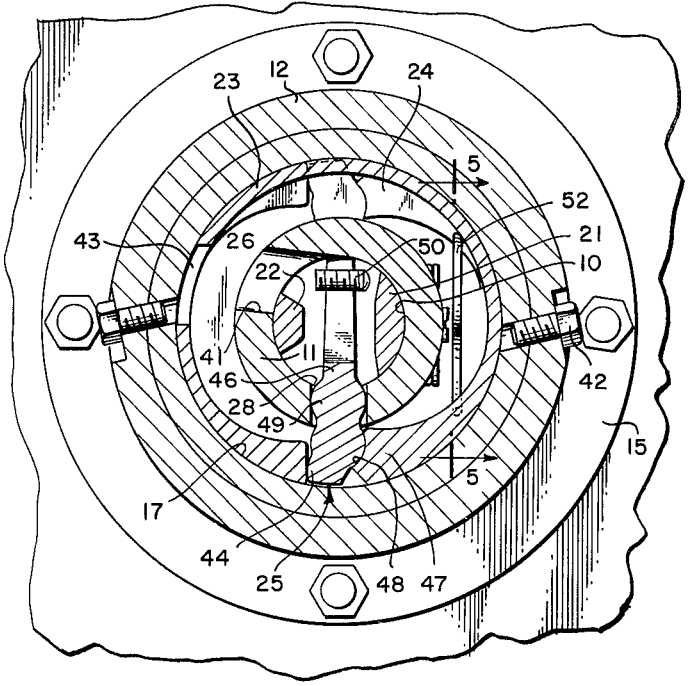
FIG__3
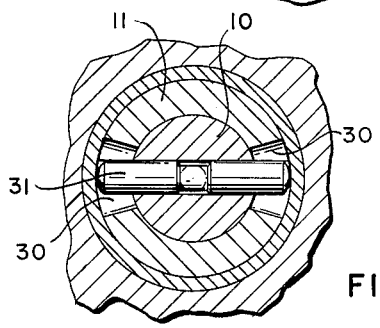
FIG__4
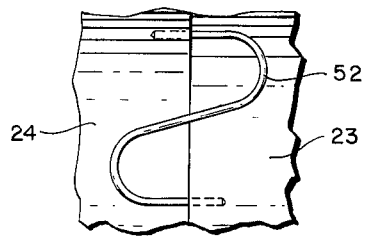
FIG__5
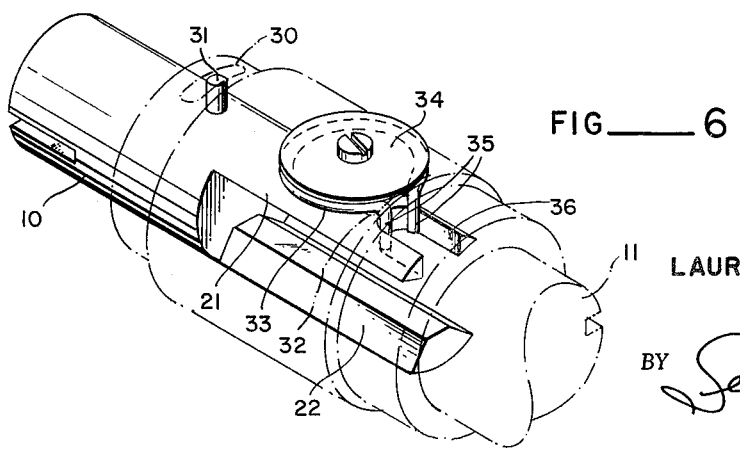
FIG__6
LAURENCE I. JAYNE
INVENTOR.
BY *Seed & Berry*
ATTORNEYS United States Patent Office 3,237,735
Patented Mar. 1, 1966

3,237,735
IRREVERSIBLE DRIVE
Laurence I. Jayne, Renton, Wash., assignor to Pacific Car and Foundry Company, a corporation of Washington
Filed June 24, 1964, Ser. No. 377,581
14 Claims. (Cl. 192—8)

This invention relates to an irreversible drive, and namely a drive characterized in that its output end can be turned only from torque fed thereto through the input end of the drive, thus locking the drive against rotation from torsional feed back loads.

Devices for this purpose heretofore devised have had several disadvantages. One disadvantage has been an inability to absorb energy. They have been either locked or unlocked, being unable to operate in an intermediate condition. This precludes smooth release of energy, and said existing devices thus cannot be effective in an operation such, for example, as lowering weights. They have required that an auxiliary drag brake be used in that, without same, the sequence of locking and unlocking cycles produces "chatter," which causes high impact loading with a premature failure of the parts and unsatisfactory operating characteristics.

Irreversible drives, as heretofore known, have also been rather costly by reason of a need for very close manufacturing tolerances. Small contact areas and high unit pressures have dictated extremely rigid construction and also create a danger of Brinelling the locking surfaces.

Previously existing irreversible drives have been furthermore susceptible to slippage under shock reversing loads, due in part to the inertia of the input driving mechanism. A heavy load in one direction can cause the input member to turn in a minor degree. With the load then suddenly reversing direction the input shaft is in a position which can keep the locking elements from actuating.

For its principal object the present invention aims to provide an irreversible drive which will overcome the above and other disadvantages of structures which have been heretofore devised for this purpose.

It is a further object to provide a perfected mechanism which can be driven in either direction of rotation.

A still further object is to provide an irreversible drive utilizing two self-energizing brake bands which in the absence of input torque are caused to perform their braking function, so as normally to hold the drive's output end against rotation, automatically by force of torsional feed back loads.

The invention has the yet further object of providing an irreversible drive comparatively simple and rugged in construction, efficient in operation, and unusually compact.

As a further object still the invention aims to provide an irreversible drive requiring a minimum amount of servicing attention and one in which the only adjustment needed is that provided by two screws which determine the degree of rotation which the drive's input end requires in order to effectuate a release of the brake, and wherein easy access to these screws is provided from the exterior of the drive so that adjustment can be quickly performed with the parts assembled.

These and yet additional objects and advantages in view will appear and be understood in the course of the following description and claims, the invention consisting in the novel construction and in the adaptation and combination of parts hereinafter described and claimed.

In the accompanying drawings:

FIGURE 1 is a longitudinal vertical sectional view illustrating an irreversible drive constructed to embody preferred teachings of the present invention.

FIGS. 2, 3 and 4 are fragmentary transverse vertical sectional views on lines 2—2, 3—3, and 4—4, respectively, of FIG. 1.

FIG. 5 is a fragmentary longitudinal vertical sectional view on line 5—5 of FIG. 3; and FIG. 6 is a perspective view of the drive's input shaft, and associated centering spring, together with a phantom illustration of the output shaft.

Referring to said drawings, the numeral 10 denotes an input shaft and 11 designates an output shaft. The particular source of power is unimportant as is the means by which such power is applied to the input shaft. A housing 12 is provided, and the input shaft projects by an end from one end of the housing and the output shaft projects by an end from the other end of the housing. For purposes of illustration an input gear 13 is shown in phantom keyed to the exposed end of the input shaft and meshed by a complementing gear 14 so powered from the source that the input shaft can be driven in either of two rotary directions, selectively. The exposed end of the output shaft has a key-way or other suitable means for connecting the same to a load. While not shown it can be assumed, say for purposes of example, that the load is passed to the output shaft by a cable which spools upon a drum D fitted on such shaft.

Housing 12 has a flange 15 at its rear or output end bolted or otherwise rigidly secured to a stationary mounting bracket 16, and is provided interiorly with an integral liner which presents an accurately machined cylindrical inner surface 17. The cylindrical chamber has an annular end wall producing a shoulder at the back of the chamber, and a bushing 18 is fitted in the center opening of such end wall. The bushing provides a rear journal for the output shaft concentric with the cylindrical wall of the chamber. A front journal for said shaft is provided by a bushing 19 fitted in a header 20 for the housing, said header having a pilot fit in the open end of the chamber and being bolted or otherwise removably secured in place.

The housed portion of said output shaft 11 is tubular, and has a rear-end portion of the input shaft freely fitted therein. This rear-end portion is made furcate to provide rather widely separated fingers 21 and 22. Two brake bands 23 and 24 occupy the cylindrical chamber of the housing in surrounding relation to the output shaft. These brake bands, and respective activating levers 25 and 26 therefor, will be hereinafter described. Two longitudinal slots, as 27 and 28, are provided in the tubular wall of the output shaft at diametrically opposite sides thereof. These slots each accommodate a respective one of the two brake levers and are longitudinally offset so that each slot lies in the transverse vertical plane occupied by a respective one of the two brake bands.

The tubular wall of the output shaft also provides five circumferential slots. Two of these circumferential slots are denoted by 30 and occupy diametrically opposite positions in the journaled nose portion of the shaft. A pin 31 fitting snugly in a diametrical cross-bore of the input shaft has its two ends projecting into said slots 30 and serves as the driving connection from said input shaft to the output shaft. The slots perforce allow the input shaft to turn in a limited degree relative to the output shaft. The lost motion is or may approximate 7½° in each direction from its centered position. The pin 31 is held against endwise motion by an Allen-headed screw 38 lodging in a circumferential groove of the pin, the screw being applied from an exposed end of the input shaft to engage internal threads provided within a center-bore of the shaft.

One of the remaining three circumferential slots is denoted by 32 (FIG. 6). It is spaced equidistantly, considered in a direction circumferentially of the shaft, from the radial planes occupied by the longitudinal slots 27 and 28. A loop wire spring 33 with a strong spring characteristic is held seated by a keeper 34 in an annular pocket formed in the outer surface of the shaft and has inturned prongs 35 which project through said slot 32 and into a matching open-end slot 36 formed in the finger 21 of the input shaft. The force imposed by the loop of the spring 33 upon the inturned prongs 35 yieldingly resists contraction of the prongs, and thus in the absence of over-riding torque serves to center the drive pin 31 within the slots 30.

The function of the remaining two circumferential slots is to give access to adjusting screws, hereinafter described, carried by the levers 25 and 26 at the inner ends thereof.

Generally speaking, said latter slots lie diametrically opposite the slot 32. One of these access slots, 40, is spaced in a moderate degree to one side of said diameter and occupies a transverse vertical plane median to the length of the longitudinal slot 27. The other slot 41 is spaced in a moderate degree to the other side of said diameter and occupies a transverse vertical plane median to the length of the longitudinal slot 28. Access is from the exterior of the housing and adjustment is performed after the parts have been assembled. Access holes in the housing are normally closed by removable bolts 42. The brake bands 23 and 24 have respective access slots 43 which register with the slots 40 and 41.

Proceeding now to describe the brake bands, each is formed as an open annular expansible ring with a smoothly machined outside surface arranged to slide in frictional contact with the machined cylindrical inner wall of the housing. The fit to the housing is slightly loose when the band is in a free condition. A moderately wide gap is provided between the opposing ends of each band. The two bands, which are identical, each has its gap in radial alignment with a related one of the two longitudinal shaft slots 27 and 28, and the two bands are inversely mounted so that like ends point in opposite rotary directions. Both ends of the brake bands are thickened, one to a somewhat greater degree than the other, and adjacent its inner edge the thicker end 47 presents a transversely extending arcuate recess. The center about which the arc is developed lies within the gap parallel with the rotary axis of the shafts.

Said levers 25 and 26 for the brake bands are levers of the first order and, like the bands, are identical. One face of said levers presents a mating counterpart 48 of the arcuate recess to seat therein and form a fulcrum for the lever. The outer end 44 of the opposite face bears against the thinner end 45 of the brake band. Such outer end functions as the power-output arm of the lever. The power-input arm 46 passes through a related one of the two longitudinal slots 27 and 28 with its inner portion occupying a diameter of the input shaft 10 within the slot defined between the separated fingers 21 and 22. Such power-output arm of each lever perforce expands the related band, so as to frictionally grip the housing, as the lever swings about its fulcrum in one direction of its rocking motion, and releases the band as the lever swings in the opposite direction. The output shaft 11 provides the effort required to swing the lever in its band-expanding motion and results from an overrunning action of the output shaft relative to the input shaft. One of the two bands is affected by its related lever when this over-running action is in one rotary direction. The other band is affected by its related lever when the overrunning action is in the other rotary direction. The power-input arms of the levers, to permit the same to swing freely out of and into their normal radial position, are formed along each of their flanking faces with arcuate shoulders 49 having a moderately close fit in the longitudinal slots of the output shaft.

The input shaft, or more particularly the finger 21 thereof, provides the effort required to swing the lever in the latter's band-releasing motion. This is likewise the result of an over-running action, in this instance over-running of the input shaft relative to the output shaft. The effort is here passed to the power-input arm—either that of the lever related to the band 23 or the lever related to the band 24 depending upon the rotary direction of the over-running travel—by engagement of the leading side edge of the finger 21 with a related Allen-headed adjustment screw, as 50 and 51, carried by the concerned power-input arm at the inner extremity thereof. The ends of the arms 46 are each split longitudinally on a diameter of the screw hole so as to apply tension for holding the related screw in its adjusted setting.

Denoted by 52 is an S-shaped preload spring. The two ends of this spring, moderately compressed, are socketed one end in a drill-hole provided in one brake band and the other end in a drill-hole provided in the other brake band. Expansive force from this reaction spring tends to rotate the bands in opposite directions. Such force causes the levers to expand the bands against the cylinder wall of the housing and takes up any play between the output shaft 11 and the two levers. Back lash of the output shaft is confined to that due to elastic deflection of the parts.

The operation can be best described by considering the several conditions which can exist.

(1) Let it be presumed that the output shaft is subjected to a clockwise torque, as viewed from the vantage point of FIGS. 2 and 3. Lever 26 has its power-input end responsively deflected to the right, causing brake band 24 to become frictionally clamped to the housing and thus preventing rotation of the output shaft.

(2) Assume that a counter-clockwise torque is applied to the output shaft. Substituting 25 and 23 for the ordinals 26 and 24, the lock-up action described for the #1 condition is duplicated.

(3) and (4) Assume that either of the afore-described lock-up conditions exist and it is desired to rotate the output shaft in the direction in which the torque is being applied. The input shaft is rotated in the desired direction. The output shaft holds its lock until the finger 21 engages the adjustable screw 50 or 51, as the case may be. Such engagement will perforce be with screw 51 if the input shaft is turned clockwise, and with the screw 50 if the direction is counter-clockwise. The engagement reduces the locking pressure in the concerned band 24 or 23, as the case may be, until the latter slips at a rate controlled by the velocity of the input shaft. Released energy shows up as heat produced by sliding friction between the band and the housing.

(5) and (6) Let it be assumed that a torque load is being restrained and it is desired to rotate the output shaft in a direction counter to the direction of the torque load. The input shaft is rotated in the desired direction. This compresses the prongs 35 of the spring 33. This spring force acts to decrease the torque load on the unit and therefor does not cause any energy loss as a load is taken up. At this time the release finger 21 of the input shaft engages either the screw 50 or the screw 51, as the case may be, which prevents the concerned brake band from locking as the rotation of the input shaft continues. The release finger will have engaged the screw momentarily in advance of the point at which drive pin 31 reaches an end limit of the slots 30, at which time there is established a direct mechanical drive from the input shaft to the output shaft. Brake band 23 cannot resist a clockwise rotation of the output shaft, nor can brake band 24 resist a counter-clockwise rotation. Thus, if clockwise torque or counter-clockwise torque, as the case may be, is imposed upon the input shaft with sufficient force to overcome counter-directed torque of the load, the output shaft will turn with the input shaft free of any frictional resistance from the brake bands.

(7) and (8) Assume that the output shaft has no torque load and it is desired to rotate the same either in a clockwise or a counter-clockwise direction. If the direction desired is clockwise the input shaft's initial clockwise rotation operates by a compression of the spring prongs 35 to place a clockwise torque upon the output shaft, which responsively acts through lever 26 to lock the brake band 24 to the housing. Turning a little farther the release finger 21 is brought into engagement with the screw 51 and the band 24 releases enough to allow rotation of the output shaft. If the direction desired is counter-clockwise, the affected brake band is 23 and the release thereof is performed by lever 25 upon engagement of the finger 21 with the screw 50.

The material used for the brake bands, and that of the cylindrical wall against which the bands take their friction purchase, must be compatible both from the standpoint of coefficient of friction and wear qualities. Sintered iron and copper composition and steel, in the respective instance, is found to be desirable.

It will be seen from the foregoing that the irreversible drive of the present invention, in addition to its primary function of a device to hold an object accurately positioned, also acts as a brake when the object is moved in the same direction as the force which moves the object. The braking action becomes possible because of the large frictional area of the bands, to dissipate the heat generated, and also as a consequence of the method of releasing the locked bands. The long power-input arm of the lever produces a large mechanical advantage and a delicate control of the releasing action. A small torque on the input shaft can control the release of a large torque on the output shaft.

The provision of a structure having a simple means of adjustment, namely the screws 50 and 51, reduces the manufacturing cost in that the need for close tolerances is reduced. The ability to adjust for wear also gives the drive a considerably longer useful life. In the present structure, danger of Brinelling the locking surfaces is avoided by reason of the large area of the bands and the lower unit pressures which are required to resist feed back torque on the output shaft. The drive will not slip under heavy shock reversing loads. The centering spring keeps the input shaft out of the way of the locking mechanism.

It is thought that the invention, and the manner of its operation, will have been clearly understood from the foregoing detailed description of my now-preferred embodiment. Changes in the details of construction can be resorted to without departing from the spirit of the invention, wherefor it is my intention that no limitations be implied and that the hereto annexed claims be given the broadest interpretation to which the employed language fairly admits.

What I claim is:

1. In an irreversible drive, a drum held against rotation and provided interiorly with a cylindrical braking surface, input and output shafts journaled for rotation about a coinciding axis concentric with said braking surface and each having an end housed within the drum, said housed end of the input shaft having a diametrical slot, said housed end of the output shaft having a tubular portion which surrounds said slotted part of the input shaft and is itself provided with a longitudinal slot which registers with the diametrical slot, a lost-motion drive coupling between the input shaft and the output shaft, an expansible brake band for engaging said braking surface of the drum, said band being formed as an open annular ring with its opposing ends spaced apart, and a radially extending lever of the first order having its outer end received in the space between said opposing ends of the band with one face of said outer end taking a fulcrum bearing from one of said opposing ends and the other face of said outer end bearing against the other opposing end to serve as the power output arm of the lever for locking the band to and releasing the band from the drum by oppositely directed swing motions of the other or power input arm of the lever about said fulcrum as an axis, said power input arm of the lever extending from the fulcrum through the longitudinal slot of the output shaft into the diametrical slot of the input shaft to a point well beyond the rotary center of the shafts, said lost motion of the drive coupling permitting either shaft to over-run the other, said power input arm and the slots being so dimensioned that a side wall of the longitudinal slot engages the arm and swings the same in a direction to responsively expand and lock the brake band upon an over-running of the output shaft relative to the input shaft and a side wall of the diametrical slot engages the arm and swings the same in a direction to responsively release the brake band upon an over-running of the input shaft relative to the output shaft.

2. The drive structure of claim 1 in which said lost-motion drive coupling comprises a diametrical pin fitting a cross-bore of the input shaft and extending by its ends into circumferential slots formed in the output shaft.

3. The drive structure of claim 2 in which the input shaft has a predetermined degree of free over-running travel before acting upon the power input arm of the lever, said free over-running travel being somewhat less than the lost motion which occurs before said ends of the drive pin reach the end limits of said circumferential slots.

4. The drive structure of claim 2 having spring means yieldingly urging said ends of the drive pin directively from the end limits of the circumferential slots.

5. The drive structure of claim 1 having adjustable regulating means for predetermining the degree to which the input shaft over-runs the output shaft before said side wall of the diametrical slot engages the power input arm of the lever.

6. The drive structure of claim 5, said regulating means comprising a screw threaded in the power input arm to occupy a position normal to the plane of the arm, with an end of the screw protruding so as to be engaged by said side wall of the diametrical slot.

7. The drive structure of claim 5, said regulating means comprising a screw threaded in the power input arm to occupy a position normal to the plane of the arm, with an end of the screw protruding so as to be engaged by said side wall of the diametrical slot, means being provided giving access to said screw, for adjusting purposes, from a position exterior to the assembled irreversible drive.

8. The drive structure of claim 1, said drum being open at one end and closed at the other end, and having a removable header closing the open end, the drum and the header providing axially spaced rotary journals for the output shaft, the housed end of the input shaft having a journal fit within the output shaft.

9. In an irreversible drive, a drum held against rotation and provided interiorly with a cylindrical braking surface, input and output shafts journaled for rotation about a coinciding axis concentric with said braking surface and each having an end housed within the drum, said housed end of the input shaft having a diametrical slot, said housed end of the output shaft having a tubular portion which surrounds said slotted part of the input shaft and is itself provided with diametrically opposite longitudinal slots staggered endwise to the rotary axis and each in registration with the diametrical slot, means for rotating the input shaft in either rotary direction selectively, a lost-motion drive coupling between the input shaft and the output shaft, a pair of expansible brake bands for engaging said braking surface of the drum each transversely aligned with a respective one of said longitudinal slots, said bands being each formed as an open annular ring with its opposing ends spaced apart and each having said opening radially aligned with a related longitudinal slot, and a pair of radially extending levers of the first order, one for each brake band, each having its outer end received in the space between said opposing ends of the related band with one face of said outer end taking a fulcrum bearing from one of said opposing ends and the other face of said outer end bearing against the other opposing end to serve as the power output arm of the lever for locking the band to and releasing the band from the drum by oppositely directed swing motion of the other or power input arm of the lever about said fulcrum as an axis, the rotary directions in which said levers swing to lock and release the related band being opposite as between the two levers, said power input arms of the levers extending from the respective fulcrum through the related longitudinal slot of the output shaft into the diametrical slot of the input shaft to a point well beyond the rotary center of the shafts, said lost motion of the drive coupling permitting either shaft to over-run the other, said parts being so formed and arranged that, in one direction of rotation, the power input arm of one lever is swung so as to responsively expand and lock the related brake band upon an over-running of the output shaft relative to the input shaft and so as to responsively release the brake band upon an over-running of the input shaft relative to the output shaft and, in the other direction of rotation, the power input arm of the other lever is swung so as to responsively expand and lock the related brake band upon an over-running of the output shaft relative to the input shaft and so as to responsively release the brake band upon an over-running of the input shaft relative to the output shaft.

10. The drive structure of claim 9, the lost-motion drive coupling comprising a diametrical pin fitting a cross-bore of the input shaft and extending by its ends into circumferential slots formed in the output shaft, and having a strong spring yieldingly holding the two shafts in a position whereat the ends of said drive pin are centered relative to the end limits of the circumferential slots.

11. The drive structure of claim 9, spring means being provided yieldingly urging the two brake bands in opposite rotational directions tending to expand the bands against the braking surfaces.

12. In an irreversible drive, a member provided interiorly with a cylindrical braking surface, means for holding said member against rotation, input and output shafts journaled for rotation within said member about a coinciding axis concentric with said braking surface, a lost-motion driving connection between the two shafts, a brake band for the brake surface, means including a lever operatively interconnecting the input shaft and the output shaft both one with the other and with the brake band and acting automatically to cause an expansion of the band so as to set the brake upon an over-running of the output shaft relative to the input shaft and to cause a contraction of the band so as to release the brake upon an over-running of the input shaft relative to the output shaft means being provided for turning the input shaft in either rotary direction, selectively, and a second brake band and a second lever for the second brake band with the two hand-and-lever sets being arranged opposite to one another so that one set is made to operate when the over-running action is in one direction and the other set is made to operate when the over-running action is in the other direction, the input shaft being permitted to over-run the output shaft in a moderate degree before causing the lever to perform its band-releasing function.

13. Structure according to claim 12 having adjustable regulating means for predetermining the degree to which the input shaft over-runs the output shaft before acting through the concerned lever to release the related band, access being provided so that said regulating means can be adjusted with the parts assembled.

14. Structure according to claim 12 in which the degree to which the input shaft can over-run the output shaft before acting through the concerned lever to release the related band is less than the lost motion provided in the driving connection.

References Cited by the Examiner

FOREIGN PATENTS 1,004,827  12/1951  France.

DAVID J. WILLIAMOWSKY, *Primary Examiner.*

DON A. WAITE, *Examiner.*

A. T. McKEON, *Assistant Examiner.*